United States Patent
Mathis (10) Patent No.: US 12,164,286 B2
(45) Date of Patent: Dec. 10, 2024

(54) METHOD AND ELECTRONIC DEVICE FOR CONTROLLING A MANUFACTURING OF A GROUP OF FINAL METAL PRODUCT(S) FROM A GROUP OF INTERMEDIATE METAL PRODUCT(S), RELATED COMPUTER PROGRAM, MANUFACTURING METHOD AND INSTALLATION

(71) Applicant: ArcelorMittal, Luxembourg (LU)

(72) Inventor: Gaël Mathis, Montataire (FR)

(73) Assignee: ARCELORMITTAL, Luxembourg (LU)

( * ) Notice: Subject to any disclaimer, the term of this patent is extended or adjusted under 35 U.S.C. 154(b) by 550 days.

(21) Appl. No.: 17/414,928

(22) PCT Filed: Dec. 18, 2018

(86) PCT No.: PCT/IB2018/060250
§ 371 (c)(1),
(2) Date: Jun. 16, 2021

(87) PCT Pub. No.: WO2020/128573
PCT Pub. Date: Jun. 25, 2020

(65) Prior Publication Data
US 2022/0066430 A1  Mar. 3, 2022

(51) Int. Cl.
G05B 19/418 (2006.01)

(52) U.S. Cl.
CPC . *G05B 19/41885* (2013.01); *G05B 19/41865* (2013.01); *G05B 19/4188* (2013.01)

(58) Field of Classification Search
CPC ........ G05B 19/41885; G05B 19/41865; G05B 19/4188; G05B 2219/32324; Y02P 90/02
See application file for complete search history.

(56) References Cited

U.S. PATENT DOCUMENTS

| | | | |
|---|---|---|---|
| 6,546,310 B1 * | 4/2003 | Doll | G05B 13/0265 700/40 |
| 6,697,516 B1 | 2/2004 | Alexandre | |

(Continued)

FOREIGN PATENT DOCUMENTS

| | | |
|---|---|---|
| CN | 102632082 A | 8/2012 |
| CN | 104573278 A | 4/2015 |

(Continued)

OTHER PUBLICATIONS

G. Nastasi, V. Colla and M. Del Seppia, "A Route Planning Optimisation System for the Steelmaking Industry Based on Multi-objective Evolutionary Algorithms," 2014 European Modelling Symposium, Pisa, Italy, 2014, pp. 326-331, doi: 10.1109/EMS.2014.50. (Year: 2014).*

(Continued)

*Primary Examiner* — Christopher E. Everett
(74) *Attorney, Agent, or Firm* — Davidson Kappel LLC (57) ABSTRACT

A method for controlling a manufacturing of final metal product(s) from intermediate metal product(s) is implemented by an electronic controlling device and comprises, for each intermediate metal product acquiring (110) a set of intermediate characteristic(s) ($C_{IP}$) for said intermediate metal product; determining (120) a current estimated set of final characteristic(s) ($C_{est\_cur}$) with a prediction model, according to the set of intermediate characteristic(s) and a current manufacturing route; comparing (130) the current estimated set of final characteristic(s) with a current target set of final characteristic(s) ($C_{target\_cur}$); and if a deviation between the current estimated set of final characteristic(s) and target set of final characteristic(s) is above a threshold obtaining (140) new target set(s) of final characteristic(s) ($C_{target\_new}$) for new final metal product(s); and calculating (150) a new manufacturing route according to the set of (Continued)

intermediate characteristic(s) and to the new target set(s) of final characteristic(s).

20 Claims, 4 Drawing Sheets (56) References Cited

U.S. PATENT DOCUMENTS

| | | |
|---|---|---|
| 6,778,694 B1 | 8/2004 | Alexandre |
| 2002/0143417 A1 | 10/2002 | Ito et al. |
| 2003/0195648 A1* | 10/2003 | Bacin .............. G06Q 10/06 700/100 |
| 2007/0088524 A1* | 4/2007 | Burvenich .......... G05B 13/021 702/130 |
| 2007/0286472 A1 | 12/2007 | Reunanen et al. |
| 2011/0098862 A1 | 4/2011 | Andrei et al. |
| 2014/0175713 A1 | 6/2014 | Roessiger et al. |
| 2016/0162625 A1 | 6/2016 | Moroz et al. |
| 2017/0002440 A1 | 1/2017 | Sprock et al. |
| 2017/0297072 A1 | 10/2017 | Kuyama |
| 2017/0298491 A1* | 10/2017 | Toschi ................ C21D 7/13 |
| 2018/0292811 A1* | 10/2018 | Baseman .......... G05B 13/0265 |

FOREIGN PATENT DOCUMENTS

| | | |
|---|---|---|
| DE | 102012214113 A1 | 2/2014 |
| FR | 2761474 A1 | 10/1998 |
| FR | 2761475 A1 | 10/1998 |
| FR | 2761476 A1 | 10/1998 |
| FR | 2896899 A1 | 8/2007 |
| GB | 1256067 A | 12/1971 |
| JP | H10540 A | 1/1998 |
| JP | 2001331209 A | 11/2001 |
| JP | 2002161316 A | 6/2002 |
| JP | 2003328030 A | 11/2003 |
| JP | 2005059070 A | 3/2005 |
| JP | 2006004428 A | 1/2006 |
| JP | 2007083299 A | 4/2007 |
| JP | 2010044605 A | 2/2010 |
| JP | 2010218251 A | 9/2010 |
| JP | 2013226566 A | 11/2013 |
| KR | 20080022074 A | 3/2008 |
| KR | 20140090925 A | 7/2014 |
| KR | 20170099550 | 9/2017 |
| WO | WO2005021811 A2 | 3/2005 |
| WO | WO2013048274 A1 | 4/2013 |

OTHER PUBLICATIONS

Iannino, Vincenzo, et al. "A multi-agent approach for the self-optimization of steel production." Int. J. Simul. Syst. Sci. Technol 19.20 (2018): 1-20. (Year: 2018).*

Zhu, Li, et al. "Modeling and Multi-objective Optimization Method for Steel Production Planning and Its Application.", AdCONIP, 2014, pp. 262-267. (Year: 2014).*

Search Report for PCT/IB2018/060250.

* cited by examiner

METHOD AND ELECTRONIC DEVICE FOR CONTROLLING A MANUFACTURING OF A GROUP OF FINAL METAL PRODUCT(S) FROM A GROUP OF INTERMEDIATE METAL PRODUCT(S), RELATED COMPUTER PROGRAM, MANUFACTURING METHOD AND INSTALLATION

TECHNICAL FIELD

The present disclosure relates to a method for controlling a manufacturing of a group of final metal product(s) from a group of intermediate metal product(s), the method being implemented by an electronic controlling device.

The present disclosure also relates to a computer program including software instructions which, when executed by a processor, implement such a controlling method.

The present disclosure also relates to a method for manufacturing a group of final metal product(s) from a group of intermediate metal product(s), the method comprising calculating at least one new manufacturing route from at least one intermediate metal product; and applying each calculated new manufacturing route to the corresponding intermediate metal product.

The present disclosure also relates to an electronic controlling device for controlling a manufacturing of a group of final metal product(s) from a group of intermediate metal product(s).

The present disclosure also relates to an installation for delivering a group of final metal product(s), the installation comprising a manufacturing line for manufacturing a group of final metal product(s) from a group of intermediate metal product(s); and such an electronic controlling device.

BACKGROUND

In many industries, particularly in industries for manufacturing metal products, such as the steel industry, products are manufactured regularly and often in advance in order to build up a stock of metal products and then respond more quickly to a customer's order.

However, it is sometimes complex to manufacture the metal product desired by the customer from the stock of existing metal products.

SUMMARY

An object of the present disclosure is therefore to provide a more reliable and efficient computer-implemented method, and a related electronic device, for controlling a manufacturing of a group of final metal product(s) from a group of intermediate metal product(s).

For this purpose, a method is provided for controlling a manufacturing of a group of final metal product(s) from a group of intermediate metal product(s), the controlling method being implemented by an electronic controlling device and comprising, for each intermediate metal product, the following steps:
  acquiring a set of intermediate characteristic(s) for said intermediate metal product;
  determining a current estimated set of final characteristic(s) with at least one corresponding prediction model and according to the set of intermediate characteristic(s) and to a respective current manufacturing route from said intermediate metal product;
  comparing the current estimated set of final characteristic(s) with a current target set of final characteristic(s) for a respective current final metal product; and
  if a deviation between the current estimated set of final characteristic(s) and the current target set of final characteristic(s) is above a predefined threshold, the method further comprises the following steps:
    obtaining at least one new target set(s) of final characteristic(s) for respective new final metal product(s); and
    calculating a new manufacturing route from said intermediate metal product according to the set of intermediate characteristic(s) and to the at least one new target set(s) of final characteristic(s)

According to other advantageous aspects of the present disclosure, the method comprises one or several of the following features, taken individually or according to any technically possible combination:
  the calculating step includes:
    determining at least one new estimated set of final characteristic(s) with at least one corresponding prediction model and according to the set of intermediate characteristic(s) and to at least one potential manufacturing route(s) from said intermediate metal product, and
    selecting one of the at least one potential manufacturing route(s) as the new manufacturing route according to a comparison of each new estimated set of final characteristic(s) with a corresponding new target set of final characteristic(s);
  the group of final metal product(s) comprises N metal products and the group of intermediate metal product(s) comprises P metal products, N and P each being an integer greater than or equal to 2;
  the calculating step further includes computing at least one pair of an intermediate metal product and a new final metal product, a respective new manufacturing route being calculated for each computed pair;
  the selecting step includes, for the group of intermediate metal product(s), comparing the new estimated set(s) of final characteristic(s) with the new target set(s) of final characteristic(s), the selected new manufacturing route(s) corresponding to the smallest difference between the new estimated set(s) of final characteristic(s) and the new target set(s) of final characteristic(s);
  the calculating step includes evaluating a unitary cost for each respective new manufacturing route by comparing the new estimated set of final characteristic(s) with the new target set of final characteristic(s) for said new manufacturing route;
  the calculating step further includes evaluating a global cost from the evaluated unitary cost(s) and for a respective collection of computed pair(s);
  the calculating step further includes:
    elaborating distinct collections of computed pair(s), a respective global cost being evaluated for each elaborated collection of computed pair(s); and
    selecting the elaborated collection of computed pair(s) with the smallest global cost, the list(s) of new manufacturing route(s) being then calculated for the selected collection of computed pair(s);
  each manufacturing route includes one or several transformation actions, each transformation action being chosen from among the group consisting of: a hot rolling; a cold rolling; a pickling; an annealing; a skin pass; an electro-galvanizing; and a coating;

each characteristic is chosen from among the group consisting of: a characteristic relating to dimensions of the product; a characteristic relating to a chemical composition of the product; a steel grade of the product; a characteristic relating to mechanical properties of the product; a characteristic relating to a surface aspect of the product; a characteristic relating to a coating of the product; a characteristic relating to a chemical surface treatment of the product; a characteristic relating to a roughness of the product; and a characteristic relating to defectology of the product;

each set of characteristic(s) comprises a yield strength of the metal product and/or an ultimate tensile strength of the metal product;

the step for determining at least one new estimated set of final characteristic(s) includes the following sub-steps:
  preliminary estimating a provisional set of final characteristic(s) with the at least one corresponding prediction model and according to the set of intermediate characteristic(s) and to a predefined median manufacturing route from said intermediate metal product,
  filtering the provisional set of final characteristic(s) according to the at least one new target set(s) of final characteristic(s), and
  establishing a respective new estimated set of final characteristic(s) according to the filtered provisional set of final characteristic(s) and to a cluster of supplementary transformation action(s), the cluster of supplementary transformation action(s) and the predefined median manufacturing route defining a respective potential manufacturing route;

each intermediate metal product is chosen from among the group consisting of: a slab, a hot rolled product and a cold rolled product;

each final metal product is a metal product resulting from at least one transformation action from a corresponding intermediate metal product;

each final metal product being preferably chosen from among the group consisting of: a hot rolled product, a cold rolled product, an electrolytic coated product, a hot dip coated product, an organic coated product, a heavy plate and a thick plate.

Therefore, with the method according to the present disclosure, if a deviation between the current estimated set of final characteristic(s) and the current target set of final characteristic(s) is above the predefined threshold, the method further comprises obtaining at least one new target set(s) of final characteristic(s) for respective new final metal product(s); and calculating a new manufacturing route from said intermediate metal product according to this at least one new target set(s) of final characteristic(s).

In other words, according to the present disclosure, if the methods detects that the current manufacturing route from a respective intermediate product will not lead to a final metal product with final characteristic(s) in accordance with the current target set of final characteristic(s), then the methods calculates a new manufacturing route from said intermediate metal product in order to obtain a new final metal product in accordance with at least one new target set(s) of final characteristic(s).

Each target set of final characteristic(s) is associated to a given final metal product to be manufactured and typically corresponds to a customer's order. Each target set of final characteristic(s) is for example a predefined set.

The subject matter of the present disclosure is also a computer program including software instructions which, when executed by a processor, implement a method as defined above.

The subject matter of the present disclosure is also a method for manufacturing a group of final metal product(s) from a group of intermediate metal product(s), the method comprising the following steps:
  calculating at least one new manufacturing route from at least one intermediate metal product;
  applying each calculated new manufacturing route to the corresponding intermediate metal product;
  wherein the calculating step is implemented with a method as defined above.

The subject matter of the present disclosure is also an electronic controlling device for controlling a manufacturing of a group of final metal product(s) from a group of intermediate metal product(s), the electronic controlling device comprising:
  an acquisition module (30) configured for acquiring a set of intermediate characteristic(s) for each intermediate metal product;
  a determination module (32) configured for determining, for each intermediate metal product, a current estimated set of final characteristic(s) with at least one corresponding prediction model and according to the set of intermediate characteristic(s) and to a respective current manufacturing route from said intermediate metal product;
  a comparison module (34) configured for comparing, for each intermediate metal product, the current estimated set of final characteristic(s) with a current target set of final characteristic(s) for a respective current final metal product;
  an obtaining module (36) configured for obtaining, for each intermediate metal product and if a deviation between the current estimated set of final characteristic(s) and the current target set of final characteristic(s) is above a predefined threshold, at least one new target set(s) of final characteristic(s) for respective new final metal product(s); and
  a calculation module (38) configured for calculating a new manufacturing route from said intermediate metal product according to the set of intermediate characteristic(s) and to the at least one new target set(s) of final characteristic(s).

The subject matter of the present disclosure is also an installation for delivering a group of final metal product(s), the installation comprising:
  a manufacturing line for manufacturing a group of final metal product(s) from a group of intermediate metal product(s); and
  an electronic controlling device for controlling the manufacturing of the group of final metal product(s) from the group of intermediate metal product(s), wherein the electronic controlling device is as defined above.

BRIEF DESCRIPTION OF THE DRAWINGS

The present disclosure will be better understood upon reading of the following description, which is given solely by way of example and with reference to the appended drawings, wherein.

DETAILED DESCRIPTION OF PREFERRED EMBODIMENTS

In the following of the description, the expression "substantially equal to" defines a relation of equality to plus or minus 10%, preferably to plus or minus 5%.

Figure 1:
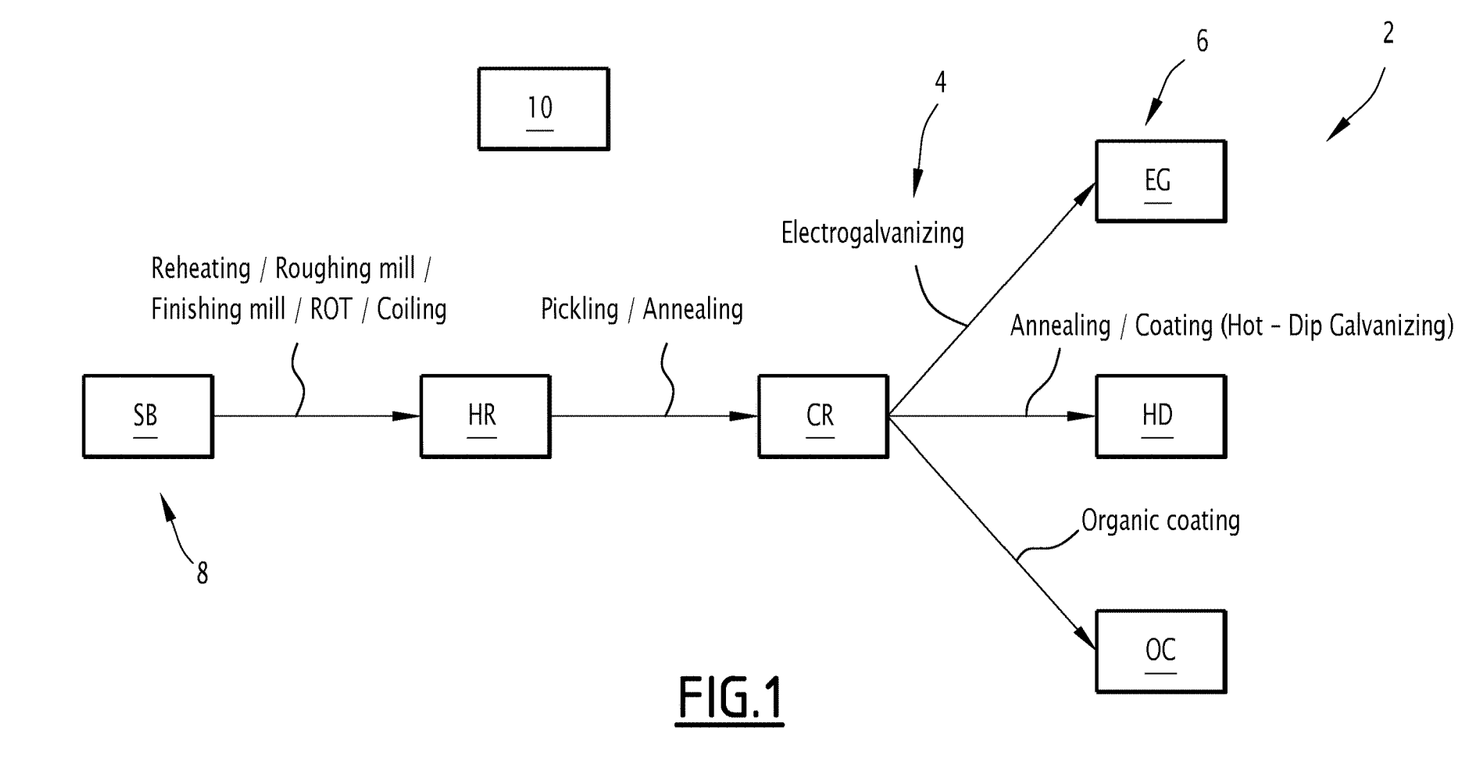
FIG. 1 is a schematic illustration of an installation for delivering a group of final metal product(s) from a group of intermediate metal product(s), the installation comprising one or several manufacturing lines for manufacturing the group of final metal product(s) and an electronic controlling device for controlling the manufacturing of the group of final metal product(s) from the group of intermediate metal product(s), according to a first manufacturing process from a slab up to an electrolytic coated product, a hot dip coated product or an organic coated product.
Figure 2:
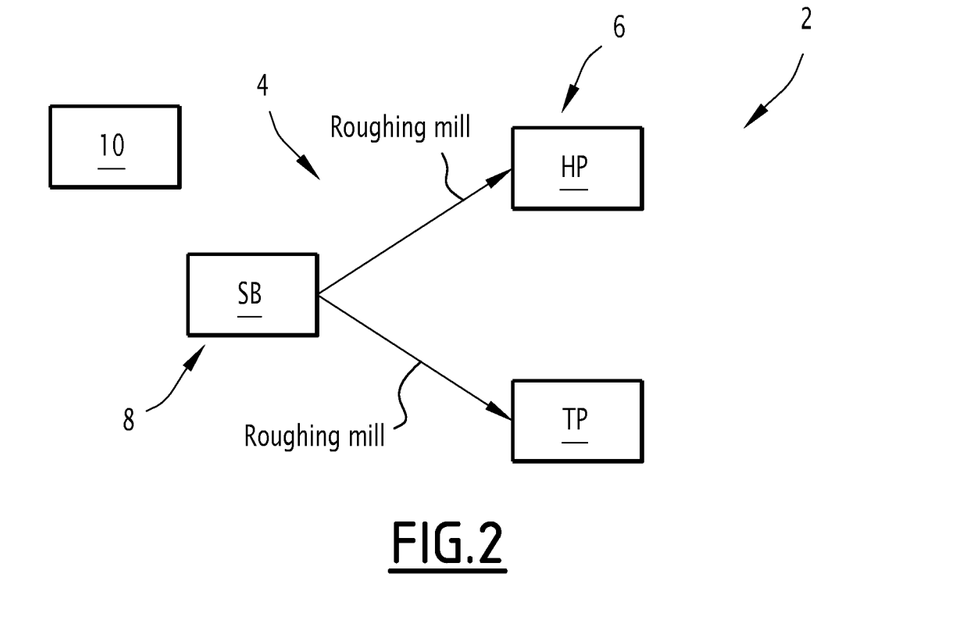
FIG. 2 is a schematic illustration similar to the one of FIG. 1, according to a second manufacturing process from a slab up to a heavy plate or a thick plate.

In FIGS. 1 and 2, an installation 2 comprises a manufacturing line 4 for manufacturing a group of final metal product(s) 6 from a group of intermediate metal product(s) 8, and an electronic controlling device 10 for controlling the manufacturing of the group of final metal product(s) 6 from the group of intermediate metal product(s) 8.

The skilled person will observe that FIG. 1, respectively FIG. 2, schematically represent two respective installations 2, with the metal products that are successively obtained according to a first manufacturing process from a slab SB up to an electrolytic coated product EG, a hot dip coated product HD or an organic coated product OC; respectively according to a second manufacturing process from the slab SB up to a heavy plate HP or a thick plate TP.

FIGS. 1 and 2 show in addition an indication of the transformation steps or actions along arrows between successive metal products.

In the embodiment of FIG. 1, the installation 2 is configured for delivering final metal products 6, such as the electrolytic coated product EG, the hot dip coated product HD or the organic coated product OC, starting initially from the slab SB.

In FIG. 1, starting from the slab SB, a hot rolled product HR is obtained after a reheating, a roughing mill, a finishing mill, a run-out table also denoted ROT and a coiling. Typically, this transformation from the slab SB to the hot rolled product HR is carried out in a hot-rolling subline including a furnace for the reheating, a succession of rolling mills, in particular the roughing mill followed by one or several finishing mills, a cooling apparatus such as the run-out table for cooling the respective metal product and a coiler. The furnace, the rolling mills, the cooling apparatus and the coiler are known per se.

Then, a cold rolled product CR is obtained from the hot rolled product HR after a cold rolling, a pickling and an annealing.

Further, the electrolytic coated product EG is obtained from the cold rolled product CR after an electro-galvanizing; or the hot dip coated product HD is obtained from the cold rolled product CR after an annealing and a coating, also called hot-dip galvanizing; or else the organic coated product OC is obtained from the cold rolled product CR after an organic coating.

Typically, the transformation from the cold rolled product CR to the hot dip coated product HD is carried out in a hot-dip galvanization subline for coating the cold rolled product CR, such as a steel strip, the hot-dip galvanization subline including a decoiler, an annealing device, a coating device and a coiler, known per se and not shown. The annealing device comprises a furnace, equipped for example with a first sensor for measuring the temperature of the corresponding metal product and a second sensor for determining the composition of the atmosphere inside the furnace. The annealing device also includes first rollers for guiding the metal product, i.e. the strip. The coating device comprises a bath of molten metal, the molten metal being for example zinc, a snout making it possible to avoid the contact of the strip with outside air between the exit of the furnace and the entry into the bath. The coating device also includes a wiping device and a cooling device. The coating device also comprises second rollers for guiding the metal product. The coating device is also equipped with a third sensor for measuring the coating thickness on the strip after wiping, and a fourth sensor for measuring the strip temperature after cooling.

In the embodiment of FIG. 2, the installation 2 is configured for delivering final metal products 6, such as the heavy plate HP or the thick plate TP, starting from the slab SB.

In FIG. 2, starting from the slab SB, the heavy plate HP is obtained after a corresponding roughing mill; or the thick plate TP is obtained after another roughing mill. Typically, this transformation from the slab SB to the heavy plate HP or respectively to the thick plate TP is carried out in a subline including one or several roughing mills.

Each manufacturing line 4 is defined as a global manufacturing line, which may include one or several manufacturing sublines that are located in the same place or in distinct places.

In addition, each manufacturing line 4 includes a set of sensors, not shown, each sensor being adapted for measuring value(s) of at least one characteristic, each characteristic being a characteristic relating to the metal product or a characteristic relating to the manufacturing process.

The electronic controlling device 10 is connected to the set of sensors and configured for using the value(s) of the characteristic(s) provided by the set of sensors. In the aforementioned example of the hot-dip galvanization subline, the set of sensors includes the first sensor, the second sensor, the third sensor and the fourth sensor.

According to the present disclosure, each intermediate metal product 8 is of the type chosen from among the slab SB, the hot rolled product HR and the cold rolled product CR; and each final metal product 6 is a metal product resulting from at least one transformation action from a corresponding intermediate metal product 8.

In the embodiments of FIGS. 1 and 2, the skilled person will therefore understand that each final metal product 6 is of the type chosen from among the group consisting of: a hot rolled product HR, a cold rolled product CR, an electrolytic coated product EG, a hot dip coated product HD, an organic coated product OC, a heavy plate HP and a thick plate TP.

Each manufacturing process includes at least one manufacturing route. The manufacturing route defines a sequence of transformation action(s), or step(s), that are operated from a respective intermediate metal product 8 with intermediate characteristic(s) so as to obtain a respective final metal product 6 with final characteristic(s). In addition, a respective manufacturing route may pass through different types of metal products, such as the hot rolled product HR and the cold rolled product CR.

In other words, each manufacturing route includes one or several transformation actions. Each transformation action is for example of the type chosen from among the group consisting of: a hot rolling; a cold rolling; a pickling; an annealing; a skin pass; an electro-galvanizing; and a coating.

In the embodiment of FIG. 1, a manufacturing route from the hot rolled product HR to the electrolytic coated product EG passes for example through the cold rolled product CR and is typically defined by the following sequence of transformation actions: pickling, annealing and then electro-galvanizing. Another manufacturing route from the slab SB to the organic coated product OC passes for example through the hot rolled product HR and then the cold rolled product CR, and is typically defined by the following sequence of transformation actions: reheating, roughing mill, finishing mill, cooling on the run-out table (ROT), coiling, cold rolling, pickling, annealing and then organic coating.

The group of final metal product(s) 6 comprises one or several final metal products 6. The group of final metal product(s) 6 preferably comprises N final metal products 6, where N is an integer greater than or equal to 2.

The group of intermediate metal product(s) 8 comprises one or several intermediate metal products 8. The group of intermediate metal product(s) 8 preferably comprises P intermediate metal products 8, where P is an integer greater than or equal to 2.

FIGS. 1 and 2 show examples of intermediate metal products 8 and final metal products 6, but—for sake of clarity—do not show the group of final metal product(s) 6 and the group of intermediate metal product(s) 8 with several final metal products 6 and several intermediate metal products 8.

The skilled person will also understand that the group of final metal product(s) 6 may comprise several final metal products 6 of the same type, in particular with distinct characteristic(s), such as several electrolytic coated products EG, several hot dip coated products HD, or several organic coated products OC. Similarly, the group of intermediate metal product(s) 8 may comprise several intermediate metal products 8 of the same type, in particular with distinct characteristic(s), such as several slabs SB or several hot rolled products HR.

In the following of the description, the selected orientations are indicative and are meant with respect to the Figures. In particular, the terms of «upstream» and «downstream» are meant relatively to the orientation selected in the Figures. These terms are used with respect to a running corresponding metal product. Moreover, the terms of «transverse», «longitudinal» and «vertical» should be understood with respect to a running direction of the corresponding metal product, which is a longitudinal direction. In particular, the term of «longitudinal» refers to a direction parallel to the running direction of the metal product, the term of «transverse» refers to a direction orthogonal to the running direction of the metal product and contained in a plane parallel to the top and bottom surfaces of the metal product, and the term of «vertical» refers to a direction orthogonal to the running direction of the metal product and orthogonal to the top and bottom surfaces of the metal product.

Furthermore, by «length» a dimension of an object in the longitudinal direction will be referred to, by «width» a dimension of an object in a transverse direction, and by «thickness» a dimension of an object in a vertical direction.

Figure 3:
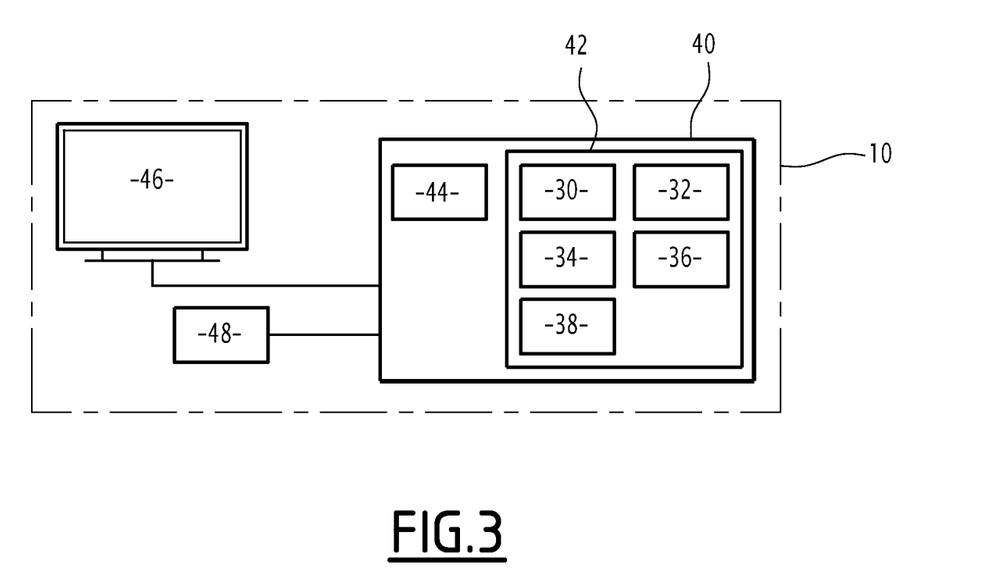
FIG. 3 is a schematic illustration of the electronic controlling device of FIG. 1 or 2.

The electronic controlling device 10 comprises an acquisition module 30 configured for acquiring a set of intermediate characteristic(s) $C_{IP}$ for each intermediate metal product 8.

The electronic controlling device 10 comprises a determination module 32 configured for determining, for each intermediate metal product 8, a current estimated set of final characteristic(s) $C_{est\_cur}$ with at least one corresponding prediction model and according to the set of intermediate characteristic(s) $C_{IP}$ and to a respective current manufacturing route from said intermediate metal product 8.

The electronic controlling device 10 comprises a comparison module 34 configured for comparing, for each intermediate metal product 8, the current estimated set of final characteristic(s) with a current target set of final characteristic(s) $C_{target\_cur}$ for a respective current final metal product 6.

The electronic controlling device 10 comprises an obtaining module 36 configured for obtaining, for each intermediate metal product 8 and if a deviation between the current estimated set of final characteristic(s) $C_{est\_cur}$ and the current target set of final characteristic(s) $C_{target\_cur}$ is above a predefined threshold, at least one new target set(s) of final characteristic(s) $C_{target\_new}$ for respective new final metal product(s) 6.

The electronic controlling device 10 comprises a calculation module 38 configured for calculating a new manufacturing route from said intermediate metal product 8 according to the set of intermediate characteristic(s) $C_{IP}$ and to the at least one new target set(s) of final characteristic(s) $C_{target\_new}$.

The terms "modeling" and "model" refer to a numerical simulation, such as a simulation running on a computer.

In the example of FIG. 3, the electronic controlling device 10 includes a processing unit 40 formed for example of a memory 42 and of a processor 44 coupled to the memory 42. In this example, the electronic controlling device 10 also includes a display screen 46 and input/output means 48, such as a keyboard and a mouse, each being connected to the processing unit 40.

In the example of FIG. 3, the acquisition module 30, the determination module 32, the comparison module 34, the obtaining module 36 and the calculation module 38 are for example each realized, i.e. implemented, as a software executable by the processor 44. The memory 42 of the processing unit 40 is adapted to store an acquisition software for acquiring a set of intermediate characteristic(s) $C_{IP}$ for each intermediate metal product 8; a determination software for determining, for each intermediate metal product 8, a current estimated set of final characteristic(s) $C_{est\_cur}$ with at least one corresponding prediction model and according to the set of intermediate characteristic(s) $C_{IP}$ and to a respective current manufacturing route from said intermediate metal product 8; a comparison software for comparing, for each intermediate metal product 8, the current estimated set of final characteristic(s) with a current target set of final characteristic(s) $C_{target\_cur}$ for a respective current final metal product 6; an obtaining software for obtaining, for each intermediate metal product 8 and if a deviation between the current estimated set of final characteristic(s) $C_{est\_cur}$ and the current target set of final characteristic(s) $C_{target\_cur}$ is above a predefined threshold, at least one new target set(s) of final characteristic(s) $C_{target\_new}$ for respective new final metal product(s) 6; and a calculation software for calculating a new manufacturing route from said intermediate metal product 8 according to the set of intermediate characteristic(s) $C_{IP}$ and to the at least one new target set(s) of final characteristic(s) $C_{target\_new}$. The processor 44 of the processing unit 40 is then configured to execute the acquisition software, the determination software, the comparison software, the obtaining software and the calculation software.

As a variant not shown, the acquisition module 30, the determination module 32, the comparison module 34, the obtaining module 36 and the calculation module 38 are each in the form of a programmable logic component, such as a Field Programmable Gate Array or FPGA, or in the form of a dedicated integrated circuit, such as an Application Specific integrated Circuit or ASIC.

When the electronic controlling device 10 is in the form of one or more software programs, i.e. in the form of a computer program, it is also capable of being recorded on a computer-readable medium, not shown. The computer-readable medium is, for example, a medium capable of storing electronic instructions and being coupled to a bus of a computer system. For example, the readable medium is an optical disk, a magneto-optical disk, a ROM memory, a RAM memory, any type of non-volatile memory (for example EPROM, EEPROM, FLASH, NVRAM), a magnetic card or an optical card. A computer program with software instructions is then stored on the readable medium.

The acquisition module 30 is configured for acquiring a set of intermediate characteristic(s) $C_{IP}$ for each intermediate metal product 8 and each intermediate characteristic $C_{IP}$ is a characteristic relating to the metal product 6 or relating to the manufacturing process. The acquisition module 30 is connected to the set of sensors and the acquired value(s) are preferably value(s) measured by corresponding sensor(s) of the set.

The acquisition module 30 is therefore adapted for acquiring values measured by the sensor set for some or all of the aforementioned characteristics. The acquisition module 30 is, for example, adapted to classify these measured values into tables, each table being associated with a respective characteristic.

The determination module 32 is configured for determining, for each intermediate metal product 8, the current estimated set of final characteristic(s) $C_{est\_cur}$ with at least one corresponding prediction model and according to the set of intermediate characteristic(s) $C_{IP}$ acquired by the acquisition module 30 and to a respective current manufacturing route from said intermediate metal product 8.

Each prediction model is typically a metallurgical model used to predict one or several characteristics of a subsequent metal product resulting from at least one transformation action starting from a precedent metal product.

The metallurgical model represents the metallurgical transformation(s) resulting from the at least one transformation action.

The prediction model typically allows to predict a yield strength YS and/or an ultimate tensile strength UTS of the subsequent metal product resulting from the at least one transformation action.

When the intermediate metal product 8 is the hot rolled product HR, the considered prediction models for predicting mechanical characteristics are a linear combination of chemistry, reduction rate at cold strip mill, annealing temperature and elongation at tempered mill. Therefore, a corresponding prediction model is chosen according to the chemistry, such model being typically a predefined table of values, and allows estimating a value of ultimate tensile strength UTS with process values given in a predefined table for reduction, temperature and elongation.

As another example, when the intermediate metal product 8 is the slab SB passing through the hot rolling subline, the considered prediction models for predicting mechanical characteristics are a linear combination of chemistry, rolling temperature, coiling temperature and thickness of the coil. Therefore, a corresponding prediction model is chosen according to the chemistry, such model being typically a predefined table of values, and allows estimating a value of ultimate tensile strength UTS and a value of yield strength YS with process values given in a predefined table for rolling and coiling temperatures.

The comparison module 34 is configured for comparing, for each intermediate metal product 8, the current estimated set of final characteristic(s) with a current target set of final characteristic(s) $C_{target\_cur}$ for a respective current final metal product 6. In particular, the comparison module 34 is configured for detecting if a deviation between the current estimated set of final characteristic(s) $C_{est\_cur}$ and the current target set of final characteristic(s) $C_{target\_cur}$ is above a respective predefined threshold.

According to the present disclosure, if a deviation between the current estimated set of final characteristic(s) $C_{est\_cur}$ and the current target set of final characteristic(s) $C_{target\_cur}$ above the predefined threshold is detected by the comparison module 34, the obtaining module 36 is then configured for obtaining at least one new target set(s) of final characteristic(s) $C_{target\_new}$ for respective new final metal product(s) 6.

Further, the calculation module 38 is configured for calculating a new manufacturing route from said intermediate metal product 8 according to the set of intermediate characteristic(s) $C_{IP}$ and to the at least one new target set(s) of final characteristic(s) $C_{target\_new}$.

The calculation module 38 is for example configured for determining at least one new estimated set of final characteristic(s) $C_{est\_new}$ with at least one corresponding prediction model and according to the set of intermediate characteristic(s) $C_{IP}$ and to at least one potential manufacturing route(s) from said intermediate metal product 8.

The prediction model(s) used by the calculation module 38 for determining the at least one new estimated set of final characteristic(s) $C_{est\_new}$ are typically similar, preferably identical, to the one(s) used by determination module 32 for determining the current estimated set of final characteristic(s) $C_{est\_cur}$.

The calculation module 38 is then configured for selecting one of the at least one potential manufacturing route(s) as the new manufacturing route according to a comparison of each new estimated set of final characteristic(s) $C_{est\_new}$ with a corresponding new target set of final characteristic(s) $C_{target\_new}$.

For determining the at least one new estimated set of final characteristic(s) $C_{est\_new}$, the calculation module 38 is for example configured for preliminary estimating a provisional set of final characteristic(s) $C_{est\_prov}$ with the at least one corresponding prediction model and according to the set of intermediate characteristic(s) $C_{IP}$ and to a predefined median manufacturing route from said intermediate metal product 8. The calculation module 38 is then configured for filtering the provisional set of final characteristic(s) $C_{est\_prov}$ according to the at least one new target set(s) of final characteristic(s) $C_{target\_new}$. The calculation module 38 is lastly configured for establishing a respective new estimated set of final characteristic(s) $C_{est\_new}$ according to the filtered provisional set of final characteristic(s) $C_{est\_prov}$ filter and to a cluster of supplementary transformation action(s). The cluster of supplementary transformation action(s) and the predefined median manufacturing route define a respective potential manufacturing route.

In other words, the new estimated set of final characteristic(s) $C_{est\_new}$ is for example determined according to a two-step process, with at first a rough estimation leading to the provisional set of final characteristic(s) $C_{est\_prov}$ and then a refinement of the estimation, by taking into account supplementary transformation action(s), and therefore leading to the new estimated set of final characteristic(s) $C_{est\_new}$.

For selecting one of the at least one potential manufacturing route(s) as the new manufacturing route, the calculation module 38 is for example configured, for the group of intermediate metal product(s) 8, for comparing the new estimated set(s) of final characteristic(s) with the new target set(s) of final characteristic(s), the selected new manufacturing route(s) corresponding to the smallest difference between the new estimated set(s) of final characteristic(s) and the new target set(s) of final characteristic(s).

In optional addition, the calculation module 38 is configured for evaluating a unitary cost for each respective new manufacturing route by comparing the new estimated set of final characteristic(s) with the new target set of final characteristic(s) for said new manufacturing route.

In another optional addition, the calculation module 38 is configured for computing at least one pair of an intermediate metal product 8 and a new final metal product 6, a respective new manufacturing route being calculated for each computed pair.

According to this optional addition, the calculation module 38 is for example configured for evaluating a global cost from the evaluated unitary cost(s) and for a respective collection of computed pair(s).

According to this optional addition, the calculation module 38 is preferably further configured for elaborating distinct collections of computed pair(s), a respective global cost being evaluated for each elaborated collection of computed pair(s); and then for selecting the elaborated collection of computed pair(s) with the smallest global cost, the list(s) of new manufacturing route(s) being then calculated for the selected collection of computed pair(s).

The skilled person will note that the calculated new manufacturing route is not necessarily a route with transformation action(s) which are of a type different than the type of transformation action(s) associated with the corresponding current manufacturing route. In other words, the new manufacturing route may differ from the corresponding current manufacturing route only through modified manufacturing parameter(s), such as a modified manufacturing temperature, a modified manufacturing speed and/or a modified manufacturing duration. Indeed, starting from the intermediate metal product 8 with the set of intermediate characteristic(s) $C_{IP}$, such modified manufacturing parameter(s) will result in a modified set of final characteristic(s) for the final metal product 6 which will be distinct from the current estimated set of final characteristic(s) $C_{est\_cur}$ associated to the current manufacturing route.

Therefore, in a general manner, the sequence of transformation action(s) of the calculated new manufacturing route differs from the one of the corresponding current manufacturing route through transformation action(s) of a different type and/or through transformation action(s) with different manufacturing parameter(s).

Each characteristic $C_{IP}$, $C_{est\_cur}$, $C_{target\_cur}$, $C_{est\_new}$, $C_{target\_new}$ is for example chosen from among the group consisting of: a characteristic relating to dimensions of the product; a characteristic relating to a chemical composition of the product; a steel grade of the product; a characteristic relating to mechanical properties of the product; a characteristic relating to a surface aspect of the product; a characteristic relating to a coating of the product; a characteristic relating to a chemical surface treatment of the product; a characteristic relating to a roughness of the product; and a characteristic relating to defectology of the product.

The characteristic relating to the mechanical properties of the metal product 6, 8 is, for example, chosen from the group consisting of: a yield strength in a given direction, such as the longitudinal direction or the transversal direction; a tensile strength in a given direction, such as the longitudinal direction or the transversal direction; a elongation to fracture in a given direction, such as the longitudinal direction or the transversal direction; a plastic-strain ratio in a given direction, such as the longitudinal direction or the transversal direction; a yield point elongation in a given direction, such as the longitudinal direction or the transversal direction; a strain hardening exponent; a bake hardening in a given direction, such as the longitudinal direction or the transversal direction; and a product hardness.

The characteristic relating to the roughness of the metal product 6, 8 is, for example, chosen from the group consisting of: a roughness for a predefined cutoff, such as a cutoff of 0.8 mm or of 2.5 mm, for a given side of the metal product 6, 8, such as a top side or a bottom side; a number of peaks per distance for a predefined threshold, such as a threshold of 0.5 µm or of 0.6, 825 µm; a texture; a maximal roughness for a given side of the metal product 6, 8, such as a top side or a bottom side; a minimal roughness for a given side of the metal product 6, 8, such as a top side or a bottom side.

The characteristic relating to the chemical composition of the metal product 6, 8 is, for example, chosen from the group consisting of: a percentage of aluminum, a percentage of arsenic, a percentage of boron, a percentage of carbon, a percentage of calcium, a percentage of cobalt, a percentage of chromium, a percentage of copper, a percentage of hydrogen, a percentage of manganese, a percentage of molybdenum, a percentage of nitrogen, a percentage of niobium, a percentage of nickel, a percentage of oxygen, a percentage of phosphorus, a percentage of lead, a percentage of sulfur, a percentage of silicon, a percentage of antimony, a percentage of tin, a percentage of titanium, a percentage of vanadium and a percentage of zirconium, in the composition of the metal product 6, 8. Percentages are expressed in volume, mass or moles.

The characteristic relating to the coating property or properties of the metal product 6, 8 is, for example, chosen from the group consisting of: a chemical composition of the coating; a coating thickness; a percentage of iron contained in the coating; a powdering of a given side of the metal product 6, 8, such as a top side or a bottom side; a minimum thickness of the coating; a maximum thickness of the coating.

The characteristic relating to the dimensions of the metal product 6, 8 is, for example, chosen from the group consisting of: a product crown; a product wedge; a product flatness deviation; a product thickness; a product width; a product length; a product flatness; a product weight.

The characteristic relating to the surface aspect of the metal product 6, 8 is, for example, chosen from the group consisting of: a blistered aspect of a given surface, such as a top surface or a bottom surface, of the product; an exfoliated aspect of a given surface of the product, a cleanness index of a given surface of the product; a stoning of a given surface of the product; a gloss of the product; a reflectance of the product; a hue of the product; a waviness W08 value for a given side of the metal product 6, 8, such as a top side or a bottom side; and a waviness W25 value for a given side of the metal product 6, 8, such as a top side or a bottom side.

The characteristic relating to the defectology of the metal product 6, 8 is, for example, chosen from the group consisting of a defect type, a defect dimension, a defect location on the metal product 6, 8.

In a preferred embodiment, the set of sensors, such as the one associated with the hot-rolling subline, includes a surface inspection device, such as the one described in published documents FR 2 761 474 A1, FR 2 761 475 A1 and FR 2 761 476 A1. In this preferred embodiment, the characteristic relating to the defectology of the metal product and/or the characteristic relating to a surface aspect of the metal product is detected and measured by the surface inspection device.

Each characteristic relating to the manufacturing process is, for example, a characteristic from among the group consisting of: a characteristic relating to manufacturing conditions, such as a manufacturing temperature, a manufacturing speed and/or a manufacturing duration; a characteristic relating to a used equipment.

All following characteristics will be given as a matter of example to illustrate which type of characteristics could be considered when applying a method according to the present disclosure to a specific manufacturing line. They are not exhaustive lists.

If the manufacturing process is a hot dip galvanizing process then each characteristic relating to the manufacturing process is, for example, a characteristic from among the group consisting of: a characteristic relating to the annealing furnace, a characteristic relating to the snout, a characteristic relating to the coating bath or a characteristic relating to the skin pass.

The characteristic relating to the annealing furnace is, for example, chosen among a strip temperature, a strip speed, a dew point of the atmosphere within the furnace, a gas injection flow rate within the furnace.

The characteristics relating to the snout is, for example, chosen among a gas injection flow rate within the snout, a zinc level within the snout, a strip temperature.

The characteristics relating to the coating bath is, for example, chosen among a bath composition, a bath temperature, a strip temperature.

The characteristics relating to the skin pass is, for example, chosen among an elongation, a tensile strength applied to the strip, a cylinder type, a cylinder diameter, a cylinder roughness, a cylinder state of wear, a clamping force.

If the manufacturing process is a hot rolling process then each characteristic relating to the manufacturing process is, for example, a characteristic relating to the reheating furnace, a characteristic relating to the roughing mill, a characteristic relating to the finishing mill, a characteristic relating to the Run-Out Table or a characteristic relating to the coiler.

The characteristic relating to the reheating furnace is, for example, chosen from the group consisting of: a slab temperature, a combustion gas composition, a combustion gas flow rate, a heating duration.

The characteristic relating to the roughing mill is, for example, chosen from the group consisting of: a metal product thickness, a metal product speed, a number of stands, a diameter of the cylinders, a lubricant flow rate, The characteristic relating to the finishing mill is, for example, chosen from the group consisting of: a strip thickness, a strip speed, a number of stands, a diameter of the cylinders, a lubricant flow rate, a cooling medium flow rate, a strip temperature, a coupling force.

The characteristic relating to the run-out table is, for example, chosen from the group consisting of: a cooling flow rate, a strip speed, a strip temperature, a phase fraction of the steel strip, a length of the run-out table, a distance between the cooling device and the strip.

The characteristic relating to the coiler is, for example, chosen from the group consisting of: a coiling speed, a mandrel diameter, a coiling temperature.

Figure 4:
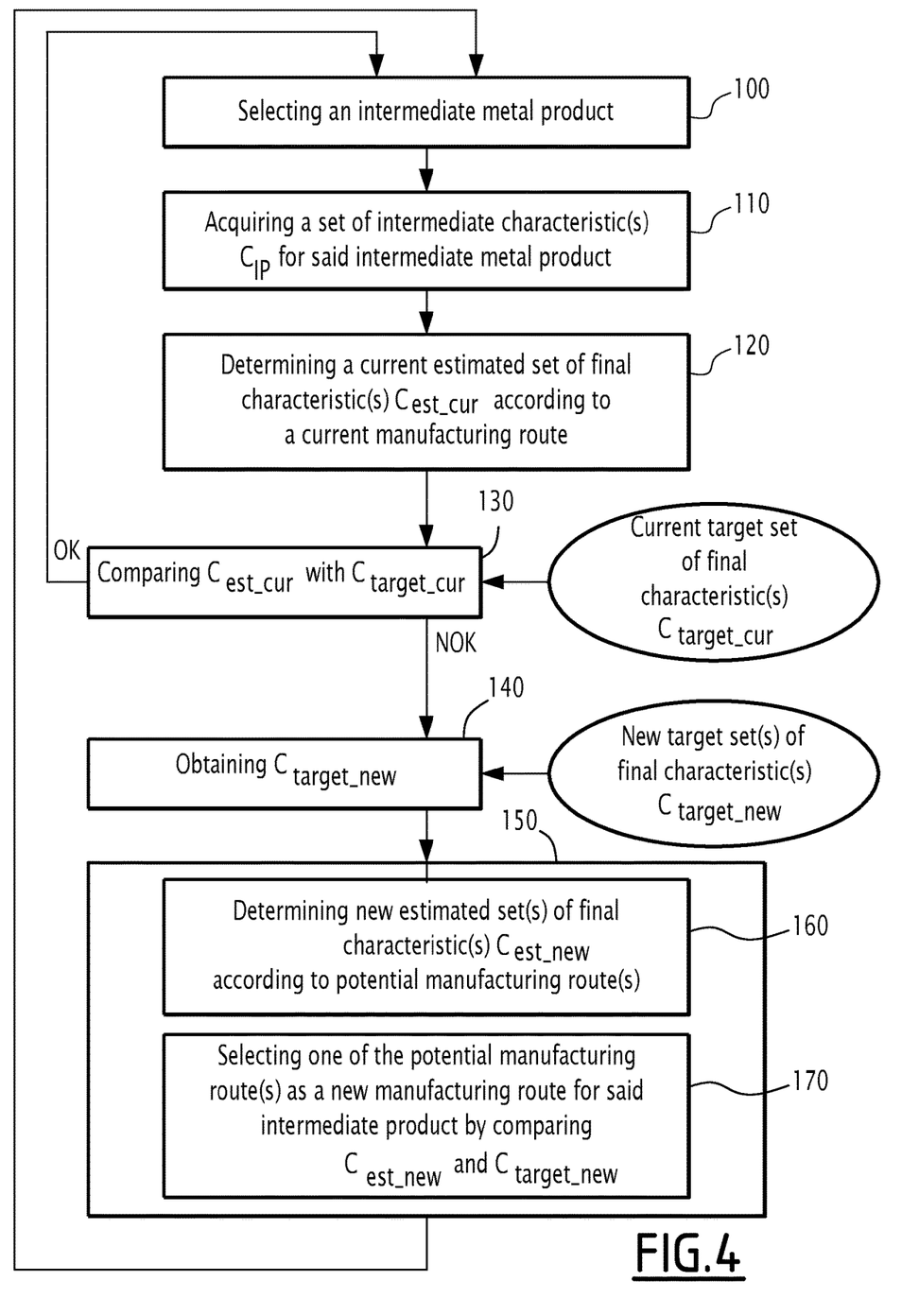
FIG. 4 is a flowchart of a method, according to the present disclosure, for controlling a manufacturing of a group of final metal product(s) from a group of intermediate metal product(s), the controlling method being implemented by the electronic controlling device of FIG. 3.
Figure 5:
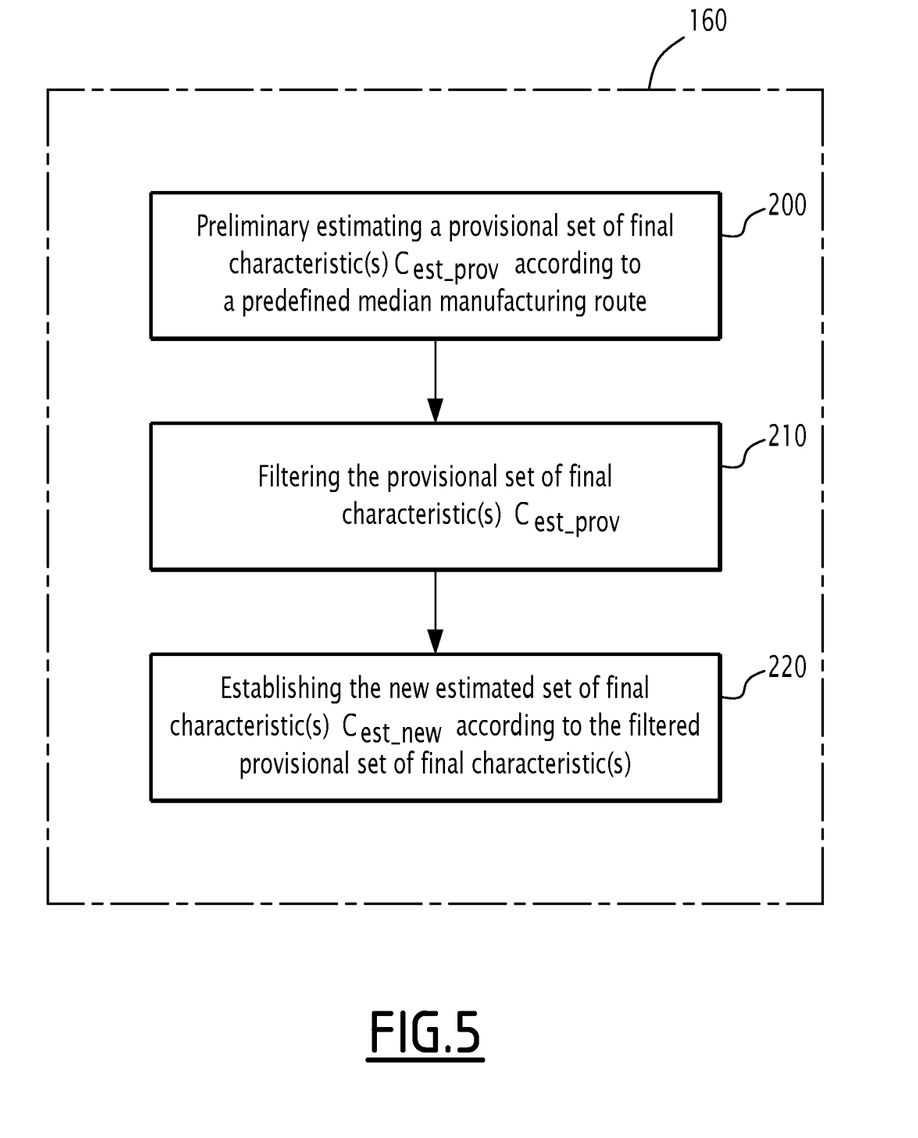
FIG. 5 is a flowchart representing a determining step of the flowchart of FIG. 4, said determining step being carried out for determining new estimated set(s) of final characteristic(s) with at least one prediction model and according to a set of intermediate characteristic(s) and to potential manufacturing route(s) from a respective intermediate metal product.

The operation of the electronic controlling device 10 according to the present disclosure will now be explained in view of FIGS. 4 and 5 representing flowcharts of a method, according to the present disclosure, for controlling the manufacturing of the group of final metal product(s) 6 from the group of intermediate metal product(s) 8.

The method is for example applied sequentially to each intermediate metal product 8 of the group of intermediate metal product(s) 8 and, in step 100, a new intermediate metal product 8 is selected by the electronic controlling device 10 for carrying out the control method to said selected intermediate metal product 8.

Then, in next step 110, the electronic controlling device 10 acquires, via its acquisition module 30, the set of intermediate characteristic(s) $C_{IP}$ for said intermediate metal product 8, typically via the set of sensors.

The electronic controlling device 10 further determines, during next step 120 and via its determination module 32, the current estimated set of final characteristic(s) $C_{est\_cur}$ with at least one corresponding prediction model and according to the set of intermediate characteristic(s) $C_{IP}$ and to a respective current manufacturing route from said intermediate metal product 8.

Therefore, the determination module 32 typically predicts at least the yield strength YS and/or the ultimate tensile strength UTS of the metal product resulting from the current manufacturing route from said intermediate metal product 8.

In step 130, the electronic controlling device 10 then compares, via its comparison module 34, the current estimated set of final characteristic(s) $C_{est\_cur}$ with a current target set of final characteristic(s) $C_{target\_cur}$ for a respective current final metal product 6.

If the difference between the current estimated set of final characteristic(s) $C_{est\_cur}$ and the current target set of final characteristic(s) $C_{target\_cur}$ is below the corresponding predefined threshold, then the electronic controlling device 10 returns to step 100 for selecting a next intermediate metal product 8 in the group of intermediate metal products 8.

Otherwise, if said difference is above the corresponding predefined threshold, i.e. if the deviation between the current estimated set of final characteristic(s) $C_{est\_cur}$ and the current target set of final characteristic(s) $C_{target\_cur}$ is above said predefined threshold, i.e. if there is no deviation in the manufacturing process, then the electronic controlling device 10 goes to next step 140 for obtaining, via its obtaining module 36, the at least one new target set(s) of final characteristic(s) $C_{target\_new}$ for respective new final metal product(s) 6, according to the present disclosure.

Further, in next step 150, the electronic controlling device 10 calculates, via its calculation module 38, a respective new manufacturing route from said intermediate metal product 8 according to the set of intermediate characteristic(s) $C_{IP}$ and to the at least one new target set(s) of final characteristic(s) $C_{target\_new}$.

In a preferred embodiment, the calculation module 38 for example determines, in a sub-step 160 of the calculation step 150, the at least one new estimated set of final characteristic(s) $C_{est\_new}$ with at least one corresponding prediction model and according to the set of intermediate characteristic(s) $C_{IP}$ and to at least one potential manufacturing route(s) from said intermediate metal product 8.

The prediction model(s) used by the calculation module 38 for determining the at least one new estimated set of final characteristic(s) $C_{est\_new}$ are for example similar to the one(s) used for determining, during step 120, the current estimated set of final characteristic(s) $C_{est\_cur}$.

According to this embodiment, the calculation module 38 then selects, during a next sub-step 170 of the calculation step 150, one of the at least one potential manufacturing route(s) as the new manufacturing route according to a comparison of each new estimated set of final characteristic(s) $C_{est\_new}$ with a corresponding new target set of final characteristic(s) $C_{target\_new}$.

For the selection sub-step 170, the calculation module 38 compares for example, for the group of intermediate metal product(s) 8, the new estimated set(s) of final characteristic(s) with the new target set(s) of final characteristic(s), and the selected new manufacturing route(s) then corresponds to the smallest difference between the new estimated set(s) of final characteristic(s) and the new target set(s) of final characteristic(s).

In optional addition, as shown in FIG. 5, for determining sub-step 160, the calculation module 38 preliminary estimates, during a phase 200, the provisional set of final characteristic(s) $C_{est\_prov}$ with the at least one corresponding prediction model and according to the set of intermediate characteristic(s) $C_{IP}$ and to a predefined median manufacturing route from said intermediate metal product 8.

According to this optional addition, the calculation module 38 then filters, during a next phase 210, the provisional set of final characteristic(s) $C_{est\_prov}$ according to the at least one new target set(s) of final characteristic(s) $C_{target\_new}$.

According to this optional addition, the calculation module 38 establishes, during last phase 220, the respective new estimated set of final characteristic(s) $C_{est\_new}$ according to the filtered provisional set of final characteristic(s) $C_{est\_prov\_filter}$ and to the corresponding cluster of supplementary transformation action(s). The cluster of supplementary transformation action(s) and the predefined median manufacturing route define a respective potential manufacturing route.

In another optional addition, the calculation module 38 computes pair(s) of intermediate metal product 8 and new final metal product 6, a respective new manufacturing route being calculated for each computed pair.

According to this optional addition, the calculation module 38 evaluates a respective global cost from the evaluated unitary cost(s) and for a respective collection of computed pair(s). The calculation module 38 further elaborates distinct collections of computed pair(s), a respective global cost being evaluated for each elaborated collection of computed pair(s); and then selects the elaborated collection of computed pair(s) with the smallest global cost, the list(s) of new manufacturing route(s) being then calculated for the selected collection of computed pair(s).

As an example, when the intermediate metal product 8 is the hot rolled product HR and further to estimating the value of ultimate tensile strength UTS with process values given in a predefined table for reduction, temperature and elongation, the calculation module 38 finds—with this value of ultimate tensile strength UTS and in a corresponding predefined table—the minimum and maximum reduction rate according to the type of model, ultimate tensile strength UTS and width. The calculation module 38 then selects new final metal products 6 with compliant thickness according to these constraints. For each selected new final metal product 6, the reduction is known and the calculation module 38 therefore calculates a new value for the ultimate tensile strength UTS. Then, according to this new value of ultimate tensile strength UTS, the calculation module 38 selects in a respective predefined table a more accurate specification of annealing temperature and a range for elongation at the tempered mill to estimate new minimum and maximum values for the ultimate tensile strength UTS. In a similar manner, the calculation module 38 estimates new minimum and maximum values for the yield strength YS. The calculation module 38 finally keeps the pairs of intermediate metal product 8 and new final metal product 6 where the ultimate tensile strength UTS and the yield strength YS are compliant.

Finally, the group of final metal product(s) 6 is manufactured from the group of intermediate metal product(s) 8 according to a manufacturing method.

The manufacturing method comprises the above described calculating at least one new manufacturing route from at least one intermediate metal product 8, and then applying each calculated new manufacturing route to the corresponding intermediate metal product 8.

Thus, the electronic controlling device 10 and the control method according to the present disclosure allow detecting that the current manufacturing route from a respective intermediate product 8 will not lead to a final metal product 6 with final characteristic(s) in accordance with the current target set of final characteristic(s) $C_{target\_cur}$. In case of such a deviation detection, the electronic controlling device 10 according to the present disclosure then permits calculating a new manufacturing route from said intermediate metal product 8 in order to obtain a new final metal product 6 in accordance with at least one new target set(s) of final characteristic(s) $C_{target\_new}$.

Each target set of final characteristic(s) $C_{target\_cur}$, $C_{target\_new}$ is associated to a given final metal product 6 to be manufactured and typically corresponds to a customer's order. Each target set of final characteristic(s) $C_{target\_cur}$, $C_{target\_new}$ is for example a predefined set.

The skilled person will therefore observe that the present disclosure provides a more reliable and efficient computer-implemented control method for controlling the manufacturing of the group of final metal product(s) 6 from the group of intermediate metal product(s) 8.

What is claimed is:

1. A method for controlling a manufacturing of a group of at least one final metal product from a group of at least one intermediate metal product, the controlling method being implemented by an electronic controlling device and comprising, for each intermediate metal product, the following steps:

acquiring a set of at least one intermediate characteristic for the intermediate metal product;

determining a current estimated set of at least one final characteristic with at least one corresponding prediction model and according to the set of at least one intermediate characteristic and to a respective current manufacturing route from the intermediate metal product;

comparing the current estimated set of at least one final characteristic with a current target set of at least one final characteristic for a respective current final metal product; and if a deviation between the current estimated set of at least one final characteristic and the current target set of at least one final characteristic is above a predefined threshold, the method further comprises the following steps:

obtaining at least one new target set of at least one final characteristic for respective new at least one final metal product; and calculating a new manufacturing route from the intermediate metal product according to the set of at least one intermediate characteristic and to the at least one new target set of at least one final characteristic, wherein the calculating step includes:

determining at least one new estimated set of at least one final characteristic with at least one corresponding prediction model, the at least one new estimated set of at least one final characteristic being determined, from the intermediate metal product, according to the set of at least one intermediate characteristic and according to a plurality of potential manufacturing routes; and selecting one of the plurality of potential manufacturing routes as the new manufacturing route according to a comparison of each new estimated set of at least one final characteristic with a corresponding new target set of at least one final characteristic.

2. The method according to claim 1, wherein the group of the at least one final metal product comprises N metal products and the group of at least one intermediate metal product comprises P metal products, N and P each being an integer greater than or equal to 2.

3. The method according to claim 1, wherein the calculating step further includes computing at least one pair of an intermediate metal product and a new final metal product, a respective new manufacturing route being calculated for each computed pair.

4. The method according to claim 1, wherein the selecting step includes, for the group of at least one intermediate metal product, comparing the at least one new estimated set of at least one final characteristic with the at least one new target set of at least one final characteristic, the selected at least one new manufacturing route corresponding to the smallest difference between the at least one new estimated set of at least one final characteristic and the at least one new target set of at least one final characteristic.

5. The method according to claim 4, wherein the calculating step includes evaluating a unitary cost for each respective new manufacturing route by comparing the new estimated set of at least one final characteristic with the new target set of at least one final characteristic for the respective new manufacturing route.

6. The method according to claim 5, wherein the calculating step further includes computing at least one pair of an intermediate metal product and a new final metal product, a respective new manufacturing route being calculated for each computed pair; and wherein the calculating step further includes evaluating a global cost from the evaluated unitary cost(s) and for a respective collection of at least one computed pair.

7. The method according to claim 6, wherein the calculating step further includes:

elaborating distinct collections of at least one computed pair, a respective global cost being evaluated for each elaborated collection of at least one computed pair; and selecting the elaborated collection of at least one computed pair with the smallest global cost, at least one list of at least one new manufacturing route being then calculated for the selected collection of at least one computed pair.

8. The method according to claim 1, wherein the step for determining at least one new estimated set of at least one final characteristic includes the following sub-steps: preliminary estimating a provisional set of at least one final characteristic with the at least one corresponding prediction model and according to the set of at least one intermediate characteristic and to a predefined median manufacturing route from said intermediate metal product, filtering the provisional set of at least one final characteristic according to the at least one new target set of at least one final characteristic, and establishing a respective new estimated set of at least one final characteristic according to the filtered provisional set of at least one final characteristic and to a cluster of at least one supplementary transformation action, the cluster of at least one supplementary transformation action and the predefined median manufacturing route defining a respective potential manufacturing route.

9. The method according to claim 1, wherein each manufacturing route includes one or several transformation actions, each transformation action being chosen from among the group consisting of: a hot rolling; a cold rolling; a pickling; an annealing; a skin pass; an electro-galvanizing; and a coating.

10. The method according to claim 1, wherein each characteristic is chosen from among the group consisting of: a characteristic relating to dimensions of the product; a characteristic relating to a chemical composition of the product; a steel grade of the product; a characteristic relating to mechanical properties of the product; a characteristic relating to a surface aspect of the product; a characteristic relating to a coating of the product; a characteristic relating to a chemical surface treatment of the product; a characteristic relating to a roughness of the product; and a characteristic relating to defectology of the product.

11. The method according to claim 1, wherein each set of at least one characteristic comprises at least one of a yield strength of the metal product and an ultimate tensile strength of the metal product.

12. The method according to claim 1, wherein each intermediate metal product is chosen from among the group consisting of: a slab, a hot rolled product and a cold rolled product.

13. The method according to claim 1, wherein each final metal product is a metal product resulting from at least one transformation action from a corresponding intermediate metal product.

14. The method according to claim 13, wherein each final metal product is chosen from among the group consisting of: a hot rolled product, a cold rolled product, an electrolytic coated product, a hot dip coated product, an organic coated product, a heavy plate and a thick plate.

15. A non-transitory computer-readable medium comprising a computer program including software instructions which, when executed by a processor, implement the method according to claim 1.

16. A method for manufacturing a group of at least one final metal product from a group of at least one intermediate metal product, the method comprising the following steps:
calculating at least one new manufacturing route from at least one intermediate metal product by implementing the method according to claim 1;
applying each calculated new manufacturing route to the corresponding intermediate metal product.

17. An electronic controlling device for controlling a manufacturing of a group of at least one final metal product from a group of at least one intermediate metal product, the electronic controlling device comprising:
an acquisition module configured for acquiring a set of at least one intermediate characteristic for each intermediate metal product;
a determination module configured for determining, for each intermediate metal product, a current estimated set of at least one final characteristic with at least one corresponding prediction model and according to the set of at least one intermediate characteristic and to a respective current manufacturing route from the intermediate metal product;
a comparison module configured for comparing, for each intermediate metal product, the current estimated set of at least one final characteristic with a current target set of at least one final characteristic for a respective current final metal product;
an obtaining module configured for obtaining, for each intermediate metal product and if a deviation between the current estimated set of at least one final characteristic and the current target set of at least one final characteristic is above a predefined threshold, at least one new target set of at least one final characteristic for a respective at least one new final metal product; and
a calculation module configured for calculating a new manufacturing route from said intermediate metal product according to the set of at least one intermediate characteristic and to the at least one new target set of at least one final characteristic
wherein the calculating step includes:
determining at least one new estimated set of at least one final characteristic with at least one corresponding prediction model, the at least one new estimated set of at least one final characteristic being determined, from the intermediate metal product, according to the set of at least one intermediate characteristic and according to a plurality of potential manufacturing routes; and
selecting one of the plurality of potential manufacturing routes as the new manufacturing route according to a comparison of each new estimated set of at least one final characteristic with a corresponding new target set of at least one final characteristic.

18. An installation for delivering a group of at least one final metal product, the installation comprising:
a manufacturing line for manufacturing a group of at least one final metal product from a group of at least one intermediate metal product; and
the electronic controlling device according to claim 17 for controlling the manufacturing of the group of at least one final metal product from the group of at least one intermediate metal product.

19. A method for controlling a manufacturing of a group of at least one final metal product from a group of at least one intermediate metal product, the controlling method being implemented by an electronic controlling device and comprising, for each intermediate metal product, the following steps:
acquiring a set of at least one intermediate characteristic for the intermediate metal product;
determining a current estimated set of at least one final characteristic with at least one corresponding prediction model and according to the set of at least one intermediate characteristic and to a respective current manufacturing route from the intermediate metal product;
comparing the current estimated set of at least one final characteristic with a current target set of at least one final characteristic for a respective current final metal product; and
if a deviation between the current estimated set of at least one final characteristic and the current target set of at least one final characteristic is above a predefined threshold, the method further comprises the following steps:
obtaining at least one new target set of at least one final characteristic for respective new at least one final metal product; and
calculating a new manufacturing route from the intermediate metal product according to the set of at least one intermediate characteristic and to the at least one new target set of at least one final characteristic,
wherein the group of the at least one final metal product comprises N metal products and the group of at least one intermediate metal product comprises P metal products, N and P each being an integer greater than or equal to 2,
wherein the calculating step further includes computing a plurality of pairs of an intermediate metal product and a new final metal product, a respective new manufacturing route being calculated for each computed pair of the plurality of pairs.

20. An electronic controlling device for controlling a manufacturing of a group of at least one final metal product from a group of at least one intermediate metal product, the electronic controlling device comprising:
an acquisition module configured for acquiring a set of at least one intermediate characteristic for each intermediate metal product;
a determination module configured for determining, for each intermediate metal product, a current estimated set of at least one final characteristic with at least one corresponding prediction model and according to the set of at least one intermediate characteristic and to a respective current manufacturing route from the intermediate metal product;
a comparison module configured for comparing, for each intermediate metal product, the current estimated set of at least one final characteristic with a current target set of at least one final characteristic for a respective current final metal product;
an obtaining module configured for obtaining, for each intermediate metal product and if a deviation between the current estimated set of at least one final characteristic and the current target set of at least one final characteristic is above a predefined threshold, at least one new target set of at least one final characteristic for a respective at least one new final metal product; and
a calculation module configured for calculating a new manufacturing route from said intermediate metal product according to the set of at least one intermediate characteristic and to the at least one new target set of at least one final characteristic
wherein the group of the at least one final metal product comprises N metal products and the group of at least one intermediate metal product comprises P metal products, N and P each being an integer greater than or equal to 2,
wherein the calculating step further includes computing a plurality of pairs of an intermediate metal product and a new final metal product, a respective new manufacturing route being calculated for each computed pair of the plurality of pairs.

* * * * *